(12) United States Patent
Takeuchi et al.

(10) Patent No.: US 6,258,210 B1
(45) Date of Patent: Jul. 10, 2001

(54) MULTI-LAYERED WATER-DECOMPOSABLE FIBROUS SHEET

(75) Inventors: Naohito Takeuchi; Kazuya Okada, both of Kagawa (JP)

(73) Assignee: Uni-Charm Corporation, Kawanoe (JP)

( * ) Notice: Subject to any disclaimer, the term of this patent is extended or adjusted under 35 U.S.C. 154(b) by 0 days.

(21) Appl. No.: 09/627,022

(22) Filed: Jul. 27, 2000

(30) Foreign Application Priority Data

Mar. 31, 2000 (JP) .................................................. 12-099451

(51) Int. Cl.⁷ .................................................... D21H 13/08
(52) U.S. Cl. .......................... 162/115; 162/123; 162/125; 162/129; 162/130; 162/132; 162/146; 162/149; 162/157.6; 162/157.7
(58) Field of Search ..................................... 162/109, 115, 162/123, 129, 130, 132, 146, 125, 149, 157.6, 157.7; 28/104, 105, 107; 442/408

(56) References Cited

U.S. PATENT DOCUMENTS

| | | | |
|---|---|---|---|
| 3,359,155 | * 12/1967 | Kajitani | 162/146 |
| 3,423,284 | * 1/1969 | Marek et al. | 162/146 |
| 3,785,918 | * 1/1974 | Kawai et al. | 162/146 |
| 4,012,281 | * 3/1977 | Mayer et al. | 162/149 |
| 4,144,370 | * 3/1979 | Boulton | 162/115 |
| 4,755,421 | * 7/1988 | Manning et al. | 428/224 |

FOREIGN PATENT DOCUMENTS

| | | |
|---|---|---|
| 3-292924 | 12/1991 | (JP) . |
| 6-198778 | 7/1994 | (JP) . |
| 7-24636 | 3/1995 | (JP) . |

* cited by examiner

*Primary Examiner*—Peter Chin
(74) *Attorney, Agent, or Firm*—Darby & Darby

(57) ABSTRACT

Provided is a multi-layered water-decomposable fibrous sheet with a plurality of layers each having a different fibrous constitution being integrated, including a top layer on a top surface and a back layer on a back surface. The top layer includes fibrillated rayon of at least 3% by mass of all fibers constituting the top layer. The fibrillated rayon has a degree of beating of at most 700 cc, and has primary fibers of a predetermined fiber length and microfibers extending from the primary fibers. The microfibers are entangled with and/or hydrogen-bonded to at least either of other microfibers and other fibers. The back layer includes fibers containing no fibrillated rayon, the fibers entangled with and/or hydrogen-bonded to each other, or the back layer includes the fibrillated rayon in an amount smaller than that in the top layer. The microfibers of the fibrillated rayon are entangled with and/or hydrogen-bonded to at least either of other microfibers and other fibers.

17 Claims, 6 Drawing Sheets

MULTI-LAYERED WATER-DECOMPOSABLE FIBROUS SHEET

BACKGROUND OF THE INVENTION

1. Field of the Invention

The present invention relates to a water-decomposable fibrous sheet having high strength and capable of being readily decomposed and dispersed in water flow. More precisely, it relates to such a water-decomposable fibrous sheet having a multi-layered structure.

2. Description of the Related Art

To wipe the skin of human bodies including the private parts thereof, or to clean toilets and thereabouts, used are disposable cleaning sheets made of paper or non-woven fabric. For these cleaning sheets, water-decomposable cleaning sheets that could be directly disposed of in toilets after use have been developed, as being convenient for such purposes. The degree of their decomposability in water must be high in some degree. This is because, if poorly water-decomposable cleaning sheets are disposed of in toilets after use, they will take a lot of time until they are decomposed and dispersed in septic tanks, or will clog the drainpipes around toilets, etc.

For wiping off wet dirt and for easy and effective use, many cleaning sheets for wiper applications are packaged while being wetted with a liquid detergent chemical or the like, and are put on the market. Therefore, such water-decomposable cleaning sheets must have high strength in wet to such a degree that they are well fit for wiping with them wetted with such a liquid chemical or the like, but must well decompose in water after they are disposed of in toilets.

For example, Japanese Patent Publication No.24636/1995 discloses a water-decomposable cleaning article that comprises a water-soluble binder having a carboxyl group, a metal ion and an organic solvent. However, the metal ion and the organic solvent irritate the skin.

Japanese Patent Laid-Open No. 292924/1991 discloses a water-decomposable cleaning article of polyvinyl alcohol-containing fibers with an aqueous solution of boric acid infiltrated thereinto; and Japanese Patent Laid-Open No. 198778/1994 discloses a water-decomposable napkin of polyvinyl alcohol-containing non-woven fabric with a borate ion and a bicarbonate ion introduced thereinto. However, polyvinyl alcohol is not resistant to heat, and therefore the wet strength of the water-decomposable cleaning article and the water-decomposable napkin is lowered at 40° C. or higher.

Recently, various water-decomposable absorbent articles including sanitary napkins, panty liners, disposable diapers and others have been investigated in the art. In view of their safety, however, the water-decomposable fibrous sheets mentioned above could not be used as the top sheets for those absorbent articles that shall be kept in direct contact with the skin for a long period of time, as they contain a binder and an electrolyte.

On the other hand, Japanese Patent Laid-Open No. 228214/1997 discloses a water-degradable non-woven fabric having a wet strength of from 100 to 800 gf/25 mm (from 0.98 to 7.84 N/25 mm) as measured according to JIS P-8135, which is produced by mixing fibers having a length of from 4 to 20 mm with pulp followed by entangling them through treatment with high-pressure water jets. Since the constituent fibers are entangled therein, the non-woven fabric disclosed has a bulky feel. However, in producing the non-woven fabric, long fibers are entangled through high-pressure water jet treatment, whereby the non-woven fabric produced could have such a relatively high wet strength. Therefore, according to the technique disclosed, it is difficult to realize well-balanced bulkiness, strength and water-degradability for the non-woven fabric produced, and the non-woven fabric produced is unsuitable to disposal in flush toilets, etc.

SUMMARY OF THE INVENTION

An object of the invention is to provide a water-decomposable fibrous sheet which is well decomposed in water and has good strength enough for practical use even though no binder is added thereto.

According to one aspect of the invention, a multi-layered water-decomposable fibrous sheet with a plurality of layers each having a different fibrous constitution being integrated, may comprise:

a top layer on a top surface including fibrillated rayon of at least 3% by mass of all fibers constituting the top layer, the fibrillated rayon having a degree of beating of at most 700 cc and having primary fibers of a predetermined fiber length and microfibers extending from the primary fibers, the microfibers being entangled with and/or hydrogen-bonded to at least either of other microfibers and other fibers, and a back layer on a back surface including fibers containing no fibrillated rayon, the fibers entangled with and/or hydrogen-bonded to each other, or the back layer including the fibrillated rayon in an amount smaller than that in the top layer, the microfibers of the fibrillated rayon being entangled with and/or hydrogen-bonded to at least either of other microfibers and other fibers.

According to another aspect of the invention, a multi-layered water-decomposable fibrous sheet with a plurality of layers each having a different fibrous constitution being integrated, may comprise:

a top layer on a top surface and a back layer on a back surface each including fibrillated rayon of at least 3% by mass of all fibers constituting each layer, the fibrillated rayon having a degree of beating of at most 700 cc and having primary fibers of a predetermined fiber length and microfibers extending from the primary fibers, the microfibers being entangled with and/or hydrogen-bonded to at least either of other microfibers and other fibers, and an interlayer disposed between the top layer and the back layer including fibers containing no fibrillated rayon, the fibers being entangled with and/or hydrogen-bonded to each other, or the interlayer including fibrillated rayon in an amount smaller than that in the top and back layers, the microfibers of the fibrillated rayon being entangled with and/or hydrogen-bonded to at least either of other microfibers and other fibers.

In this case, the fibrillated rayon content of the fibers constituting the top layer may be nearly the same as that of the fibers constituting the back layer.

Naturally in dry and even in wet with water, the water-decomposable fibrous sheet of the invention all the time keeps high strength. When it is immersed in a large amount of water after used and disposed of in toilets and others, it is readily decomposed. In the fibrous sheet of the invention, the microfibers of fibrillated rayon are entangled with and are further hydrogen-bonded to other fibers and other microfibers therein, thereby exhibiting their ability to bond fibers constituting the sheet and to enhance the strength of the sheet. When the fibrous sheet receives a large amount of water applied thereto, the entangled microfibers therein are loosened or the hydrogen bonds between the bonded microfibers therein are broken, whereby the fibrous sheet is readily decomposed in water.

The fibrous sheet of the invention has a multi-layered structure. In this, only the top layer may contain fibrillated rayon or the top layer may contain a larger amount of fibrillated rayon than the interlayer. The fibrous sheet of this embodiment is good, as having well-balanced decomposability in water and strength. In addition, fibrillated rayon is concentrated in the top surface of the fibrous sheet, and the microfibers extending from the fibrillated rayon therein are essentially contacted with the other layers of the sheet. As a whole thereof, therefore, the fibrous sheet can attenuate direct frictional force applied thereto. Accordingly, the surface of the water-decomposable fibrous sheet of the invention is highly resistant to friction. Fibrillated rayon is more expensive than ordinary rayon, and production of the fibrillated rayon takes a lot of time. Without requiring too much fibrillated rayon as a whole, the fibrous sheet of the invention can ensure good decomposability in water and high strength, so that production costs thereof can be low.

The water-decomposable fibrous sheet of the invention can be composed of materials not harmful to human bodies.

In the fibrous sheet of the invention, preferably, the surface of the top layer is pressed under heat so that the microfibers of the fibrillated rayon in the surface pressed under heat are hydrogen-bonded to at least either of other microfibers and other fibers. Also preferably, at least either of surfaces of the top and back layers is pressed under heat so that the microfibers of the fibrillated rayon in the surface pressed under heat are hydrogen-bonded to at least either of other microfibers and other fibers.

Preferably, in the fibrillated rayon for use herein, the primary fibers has a length of 1.8 mm to 10 mm at the peak of its self-weighted, average fiber length distribution profile curve, and microfibers having a length of at most 1 mm account for from 0.1 to 65% by mass of the self-weight of the fibrillated rayon.

The fibrous sheet of the invention may be a non-woven fabric having been subjected to water-jetting treatment. Alternatively, it may be produced in a paper-making process.

Preferably, the degree of fineness of the fibrillated rayon falls between 1.1 and 1.9 dtex.

Also preferably, the weight (this may be referred to as "Metsuke") of the fibers constituting the fibrous sheet falls between 20 and 100 g/m$^2$.

Still preferably, the decomposability in water of the fibrous sheet, measured according to JIS P-4501, is at most 200 seconds.

Still preferably, the wet strength of the fibrous sheet is at least 1.1 N/25 mm.

Also preferably, the dry strength of the fibrous sheet is at least 3.4 N/25 mm.

DESCRIPTION OF THE PREFERRED EMBODIMENTS

The fibrillated rayon for use in the invention is meant to indicate fibers of regenerated cellulose rayon having finely-fibrillated surfaces, or that is, those with submicron-sized microfibers having peeled and extending from the surfaces of the primary fibers (of the fibrillated rayon). The surface of ordinary regenerated cellulose is smooth, while that of the fibrillated rayon is fibrillated; and the two have different structures.

The fibrillated fibers of that type can be produced, for example, by mechanically processing rayon while it has absorbed water and is still wetted. Concretely, they may be produced, for example, according to a method of strongly stirring rayon in water in a mixer, or a method of beating rayon in a pulper, a refiner, a beater or the like (this is a wet-beating method). More precisely, the fibrillated rayon includes fibers as produced by processing wet-spun rayon such as polynosic or the like with an acid followed by mechanically fibrillating it, fibers as produced by mechanically fibrillating solvent-spun rayon, etc. Apart from those, the fibrillated rayon can also be produced from ordinary, wet-spun regenerated cellulose.

To specifically define the fibrillated rayon capable of being preferably used in the invention, some methods may be employed. One is to analyze the self-weighted, average fiber length distribution (the mass distribution) of the primary fibers and the microfibers constituting the fibrillated rayon. The self-weighted, average fiber length may be referred to as the weighted average length by weight. The microfibers are shorter than the primary fibers. Therefore, analyzing the distribution of the fiber length in fibrillated rayon clarifies the self-weighted, average fiber length distribution of the primary fibers and the microfibers constituting the fibrillated rayon. Another method of specifically defining the intended fibrillated rayon is based on the degree of beating rayon into fibrillated rayon (CSF; Canadian Standard Freeness).

Figure 1:
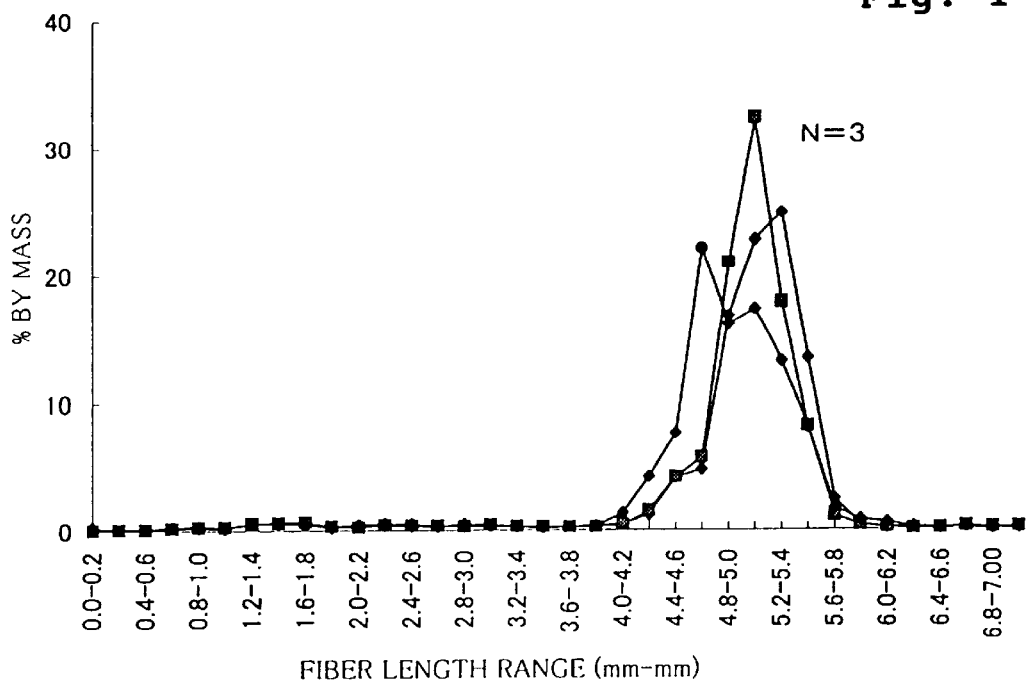
FIG. 1 is a graph showing the self-weighted, average fiber length distribution profile of the fiber length of non-beaten rayon.

First described is the self-weighted, average fiber length distribution of the primary fibers and the microfibers constituting the fibrillated rayon. For this, referred to is one example of beating rayon of which the original fiber length is 5 mm, into fibrillated rayon. The self-weighted, average fiber length distribution profile of non-beaten, non-fibrillated rayon (CSF=740 cc, fiber length 5 mm, 1.7 dtex), for which n=3, is shown in FIG. 1. As in FIG. 1, the self-weighted, average fiber length distribution in non-beaten rayon is almost concentrated in the fiber length range of 5 mm+1 mm or so. Non-beaten rayon samples all having a concentration of 0.75% by mass were prepared and beaten in wet to different degrees in a mixer. The self-weighted, average fiber length distribution of the thus-beaten, fibrillated rayon was analyzed in relation to the different fiber lengths. The resulting data are plotted to give a graph of FIG. 2.

Figure 2:
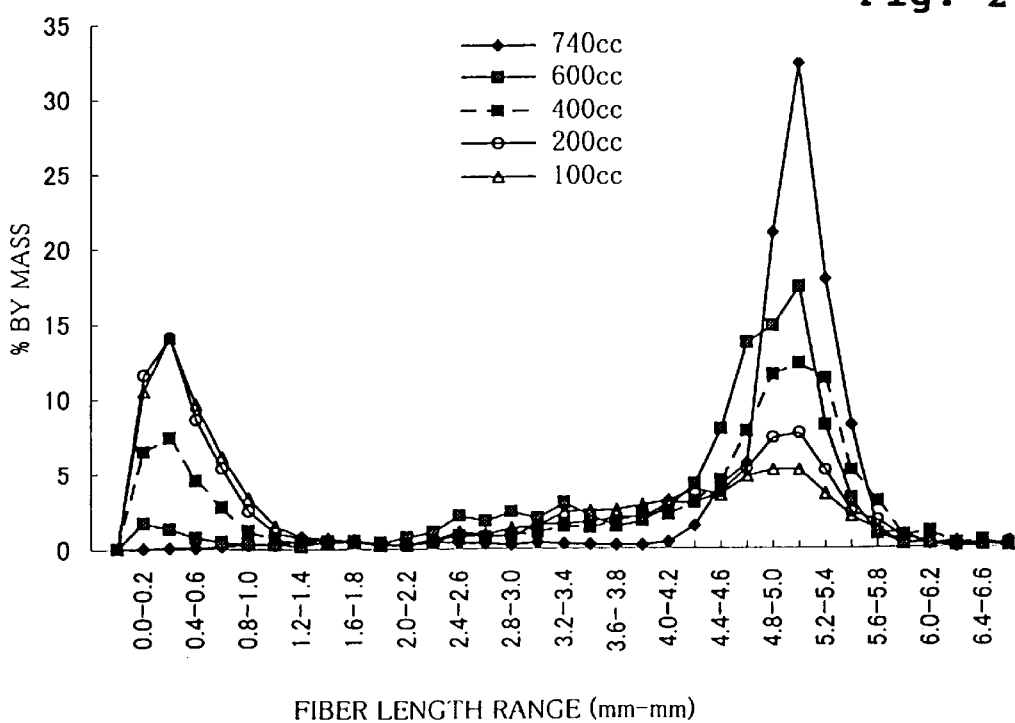
FIG. 2 is a graph showing the self-weighted, average fiber length distribution profile of the fiber length of beaten rayon, for which rayon having a fiber length of 5 mm was beaten.

As seen in FIG. 2, the self-weighted, average fiber length distribution profile of the fibrillated rayon gave two apparent peaks. Regarding its details, the area except that for fiber lengths of shorter than 1 mm is principally for the primary fibers of the fibrillated rayon, and the remaining area for fiber lengths of shorter than 1 mm includes long extending microfibers and chopped rayon fibers all resulting from too much promoted fibrillation. The fiber length of the primary fibers of the beaten, fibrillated rayon may be shorter in some degree than that of the fibers of the original, non-beaten rayon, or may be seemingly longer in some degree owing to the microfibers that extend from the primary fibers at their ends. Accordingly, in the beaten, fibrillated rayon, the fiber length of the primary fibers corresponding to the peak of the self-weighted, average fiber length distribution profile and around it falls within a range of the nominal fiber length of the non-beaten rayon ±0.5 mm or so, more precisely, within a range of from −0.3 mm to +0.1 mm or so relative to the nominal fiber length of the non-beaten rayon.

Figure 3:
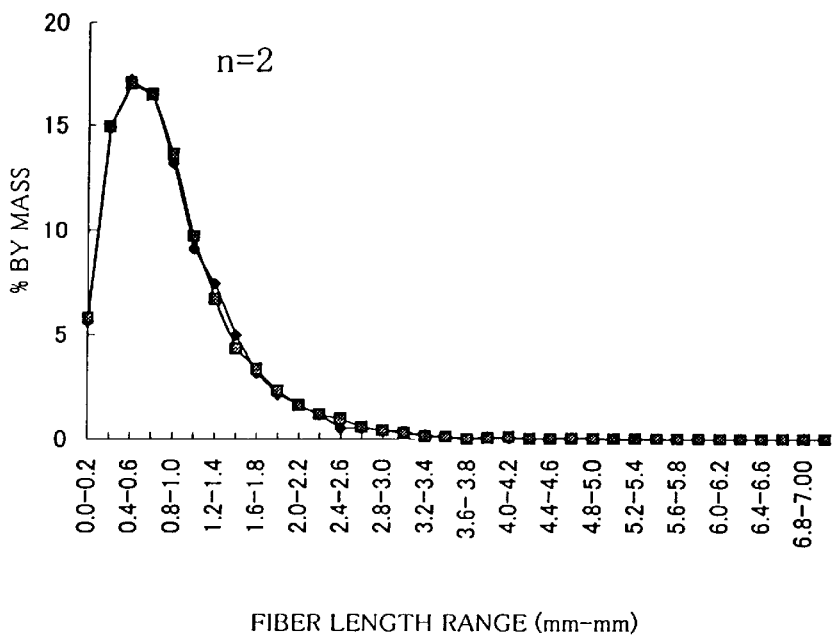
FIG. 3 is a graph showing the self-weighted, average fiber length distribution profile of the fiber length of rayon having been free-beaten.
Figure 4:
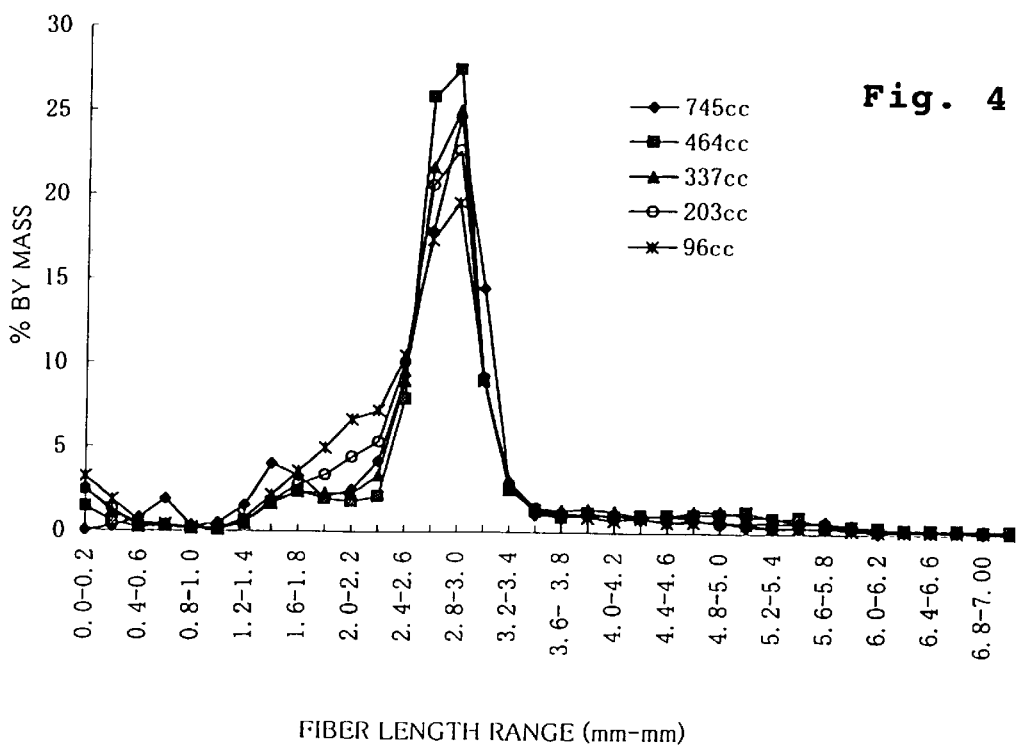
FIG. 4 is a graph showing the self-weighted, average fiber length distribution profile of the fiber length of beaten rayon, for which rayon having a fiber length of 3 mm was beaten in wet.
Figure 5:
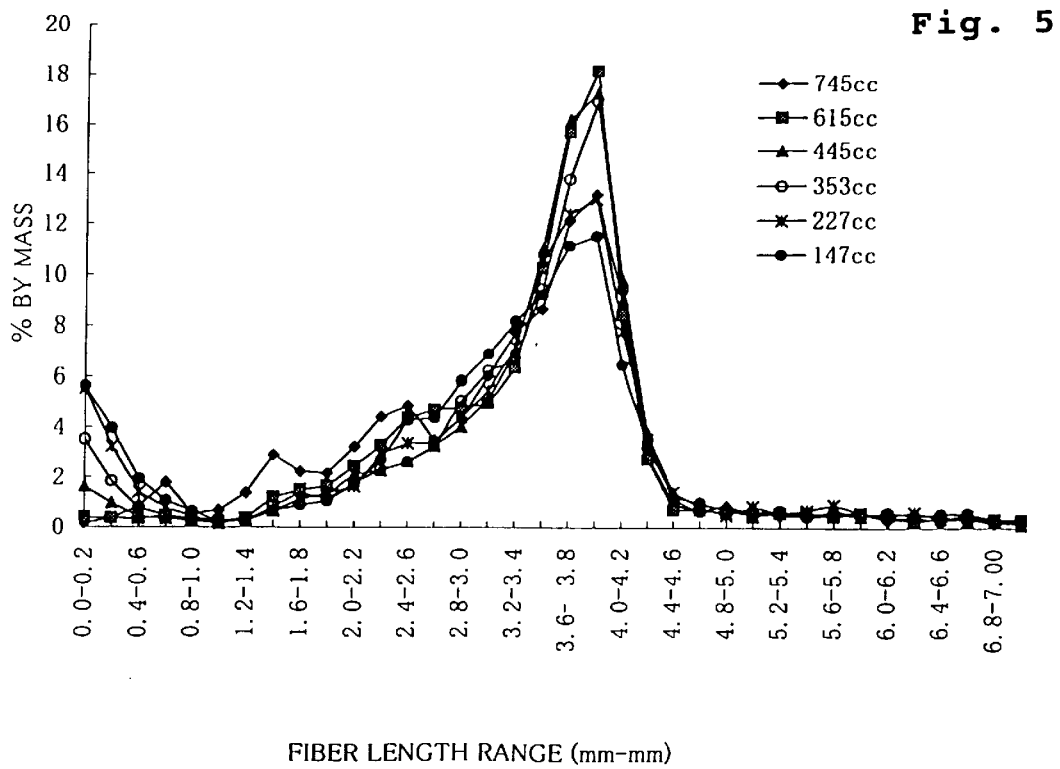
FIG. 5 is a graph showing the self-weighted, average fiber length distribution profile of the fiber length of beaten rayon, for which rayon having a fiber length of 4 mm was beaten in wet.
Figure 6:
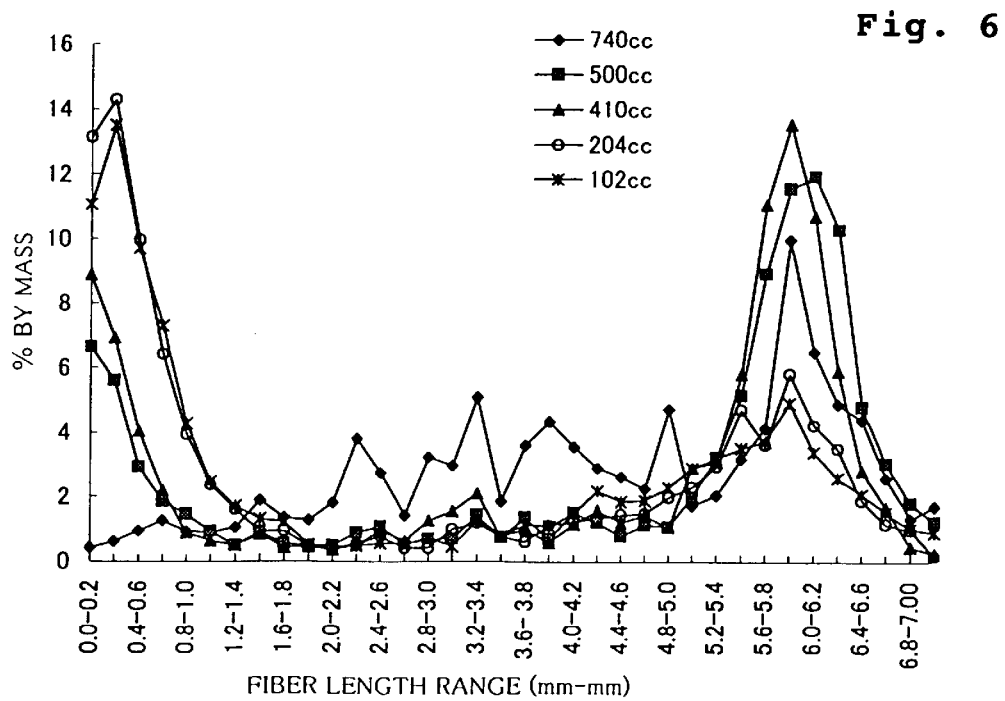
FIG. 6 is a graph showing the self-weighted, average fiber length distribution profile of the fiber length of beaten rayon, for which rayon having a fiber length of 6 mm was beaten in wet.
Figure 7:
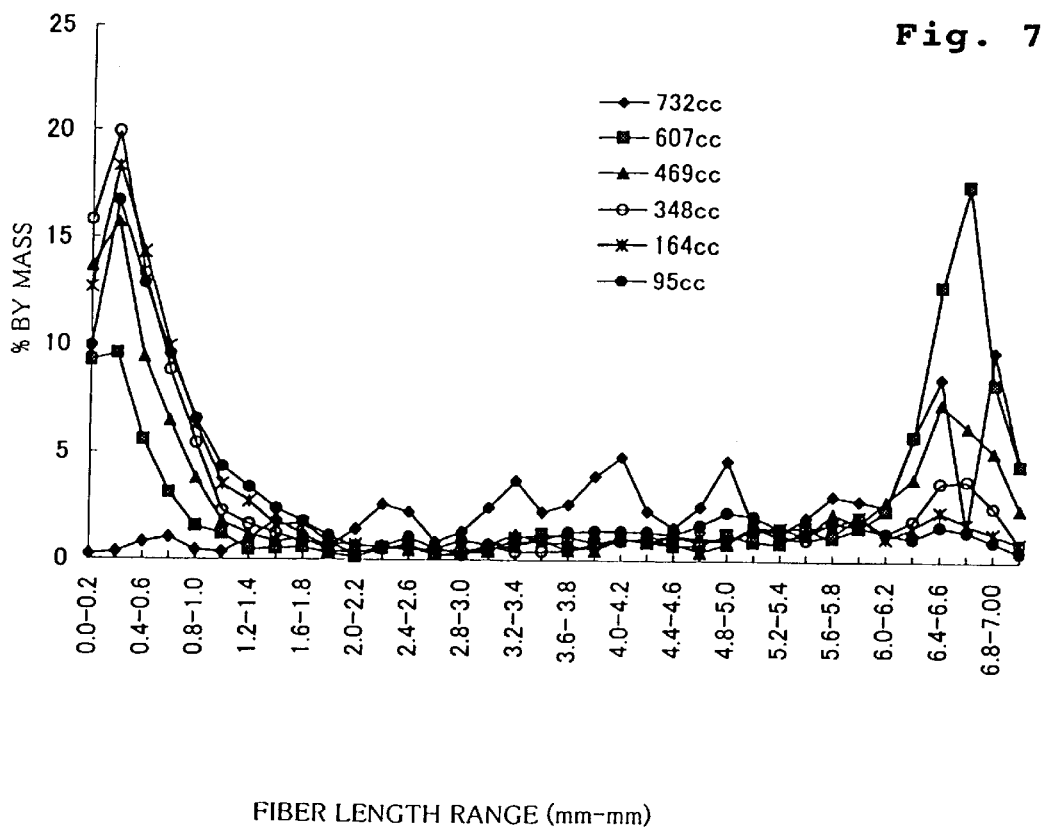
FIG. 7 is a graph showing the self-weighted, average fiber length distribution profile of the fiber length of beaten rayon, for which rayon having a fiber length of 7 mm was beaten in wet.

To that effect, the fibrillated rayon for use in the invention is identified as one having the fiber length peak for the primary fibers of the fibrillated rayon itself and the fiber length peak for the fibrillated microfibers. The fibrillated rayon is prepared by beating rayon in wet, as in the above. If, being different from this, rayon is beaten in an ordinary free-beating manner to promote its beating (so that the beaten rayon shall have a reduced numerical value indicating its degree of beating), it will be entirely pulverized into small particles, as in FIG. 3. In that condition, most of the small particles would lose the original fiber length. The free-beaten rayon is not within the scope of the fibrillated rayon for use in the invention.

Regarding the ratio of the microfibers to the fibrillated rayon preferred for use in the invention, it is desirable that the microfibers extending from the primary fibers of the fibrillated rayon and having a length of at most 1 mm account for from 0.1 to 65% by mass, more preferably from 3 to 65% by mass of the self-weight of the fibrillated rayon. Also preferably, the fiber length of the primary fibers that give the peak in the self-weighted, average fiber length distribution profile of the fibrillated rayon falls between 1.8 mm and 10.0 mm. The fibrillated rayon having the preferred morphology may be obtained by beating rayon, of which the original fiber length falls between 2.0 mm and 10.5 mm, to a degree of at most 700 cc.

The self-weighted, average fiber length distribution of the fibrillated rayon depends on both the original fiber length of the non-beaten rayon and on the degree of beating the non-beaten rayon. For other preferred examples of the fibrillated rayon for use in the invention, rayon having a different fiber length of 3 mm, 4 mm, 6 mm or 7 mm was beaten in wet in a mixer, with varying the degree of beating it, and the self-weighted, average fiber length distribution of the beaten rayon relative to the varying fiber length of the beaten rayon was analyzed. The data were plotted to give the graphs of FIG. 4 to FIG. 7. Of the beaten rayon samples whose data are plotted as in the graphs of FIG. 2 and FIGS. 4 to 7, the mass distribution of the microfibers having a length of at most 1 mm and the mass distribution of the primary fibers whose length is near to the original fiber length of the non-beaten rayon (but having varied within a range of from −0.6 mm to +0.2 mm or +0.4 mm) are given in Table 1 below. The samples having a degree of beating of 740 cc or 732 cc are non-beaten samples.

TABLE 1

| Degree of Beating (cc) | not longer than 1.0 mm (% by mass) | 2.4 to 3.4 mm (% by mass) |
|---|---|---|
| 3 mm | | |
| 745 | 3.36 | 60.33 |
| 464 | 2.61 | 72.84 |
| 337 | 4.40 | 67.89 |
| 203 | 4.49 | 65.35 |
| 96 | 6.31 | 58.86 |

| Degree of Beating (cc) | not longer than 1.0 mm (% by mass) | 3.4 to 4.4 mm (% by mass) |
|---|---|---|
| 4 mm | | |
| 745 | 3.78 | 45.66 |
| 615 | 1.85 | 55.19 |
| 445 | 3.70 | 58.02 |
| 353 | 7.02 | 59.58 |
| 227 | 11.47 | 47.23 |
| 147 | 13.28 | 41.51 |

| Degree of Beating (cc) | not longer than 1.0 mm (% by mass) | 4.4 to 5.4 mm (% by mass) |
|---|---|---|
| 5 mm | | |
| 740 | 0.69 | 76.56 |
| 600 | 4.06 | 63.80 |
| 400 | 22.49 | 47.25 |
| 200 | 35.95 | 32.77 |
| 100 | 41.76 | 22.72 |

| Degree of Beating (cc) | not longer than 1.0 mm (% by mass) | 5.4 to 6.4 mm (% by mass) |
|---|---|---|
| 6 mm | | |
| 740 | 4.19 | 28.64 |
| 500 | 18.45 | 47.78 |
| 410 | 22.90 | 46.98 |
| 204 | 47.74 | 21.85 |
| 102 | 45.81 | 18.12 |

| Degree of Beating (cc) | not longer than 1.0 mm (% by mass) | 6.4 to 7.2 mm (% by mass) |
|---|---|---|
| 7 mm | | |
| 732 | 2.83 | 34.29 |
| 607 | 28.98 | 43.07 |
| 469 | 49.06 | 24.96 |
| 348 | 63.29 | 10.72 |
| 164 | 61.53 | 6.19 |
| 95 | 55.58 | 4.39 |

Other preferred examples of the fibrillated rayon for use in the invention are shown in Table 2, Table 3 and Table 4. The data in these Tables indicate the proportion of the microfibers not longer than 1.0 mm in each fibrillated rayon sample having been prepared by beating rayon to different degrees of beating. For the samples in Table 2, rayon of originally 5 mm in length and 1.7 dtex in fineness was beaten to different degrees in a mixer; for those in Table 3, rayon of originally 3 mm in length and 1.4 dtex in fineness, or rayon of originally 3 in length and 1.7 dtex in fineness was beaten to different degrees in a pulper or a refiner; and for those in Table 4, rayon of originally 5 mm in length and 1.4 dtex in fitness, or rayon of originally 5 mm in length and 1.7 dtex in fitness was beaten to different degrees in a pulper or a refiner.

TABLE 2

| 5 mm 1.7 dtex | |
|---|---|
| Degree of Beating (cc) | not longer than 1.0 mm (% by mass) |
| 740 | 0.69 |
| 520 | 12.77 |
| 377 | 23.20 |
| 185 | 39.37 |
| 67 | 35.47 |

TABLE 3

| 3 mm 1.4 dtex | | 3 mm 1.7 dtex | |
|---|---|---|---|
| Degree of Beating (cc) | not longer than 1.0 mm (% by mass) | Degree of Beating (cc) | not longer than 1.0 mm (% by mass) |
| 644 | 0.57 | 653 | 0.16 |
| 626 | 0.46 | 584 | 0.23 |
| 595 | 0.40 | 472 | 0.43 |
| 563 | 0.78 | 372 | 0.59 |
| 480 | 0.71 | 333 | 0.63 |
| 407 | 0.69 | 291 | 1.13 |
| 352 | 0.87 | 259 | 1.25 |
| 340 | 1.05 | 212 | 1.54 |
| 297 | 1.32 | 176 | 1.92 |
| 241 | 1.39 | 163 | 3.61 |
| 211 | 1.77 | | |

TABLE 4

| 5 mm 1.4 dtex | | 5 mm 1.7 dtex | |
|---|---|---|---|
| Degree of Beating (cc) | not longer than 1.0 mm (% by mass) | Degree of Beating (cc) | not longer than 1.0 mm (% by mass) |
| 676 | 1.08 | 695 | 0.47 |
| 646 | 1.06 | 625 | 1.49 |
| 631 | 2.08 | 521 | 7.17 |
| 554 | 8.48 | 229 | 20.96 |
| 433 | 7.39 | 200 | 17.14 |
| 339 | 11.18 | 198 | 20.04 |
| 242 | 21.57 | 198 | 18.10 |
| 183 | 20.43 | 198 | 17.59 |
| 161 | 26.55 | 195 | 16.92 |
| 135 | 24.32 | 195 | 15.08 |
| | | 190 | 15.14 |
| | | 188 | 19.54 |
| | | 187 | 17.41 |
| | | 186 | 13.94 |

As in the above-mentioned Tables, in the fibrillated rayon samples from non-beaten rayon having a fiber length of 3 mm ( in these, the mass distribution peak for the primary fibers appears within a fiber length range of 3±0.5 mm), the microfibers having a length of at most 1 mm account for from 0.1 to 10% by mass of the self-weight of the fibrillated rayon. However, in the samples having been beaten in a pulper or a refiner, the uppermost limit of the microfibers is 5% by mass or so; and in those having been beaten in a pulper or a refiner to a degree of beating of at most 600 cc, the lowermost limit thereof is 0.2% by mass.

In the fibrillated rayon samples from non-beaten rayon having a fiber length of 4 mm (in these, the mass distribution peak for the primary fibers appears within a fiber length range of 4±0.5 mm), the microfibers having a length of at most 1 mm account for from 1 to 14% by mass of the self-weight of the fibrillated rayon. However, in the samples having been beaten in a pulper or a refiner, the microfibers account for from 0.3 to 10% by mass or so; and in those having been beaten in a pulper or a refiner to a degree of beating of at most 600 cc, the lowermost limit of the microfibers is 0.5% by mass.

In the fibrillated rayon samples from non-beaten rayon having a fiber length of 5 mm (in these, the mass distribution peak for the primary fibers appears within a fiber length range of 5±0.5 mm), the microfibers having a length of at most 1 mm account for from 0.3 to 45% by mass of the self-weight of the fibrillated rayon. However, in the samples having been beaten in a pulper or a refiner, the uppermost limit of the microfibers is 30% by mass or so; and in those having been beaten in a pulper or a refiner to a degree of beating of at most 600 cc, the lowermost limit thereof is 5% by mass.

In the fibrillated rayon samples from non-beaten rayon having a fiber length of 6 mm (in these, the mass distribution peak for the primary fibers appears within a fiber length range of 6±0.5 mm), the microfibers having a length of at most 1 mm account for from 5 to 50% by mass of the self-weight of the fibrillated rayon. However, in the samples having been beaten in a pulper or a refiner, the microfibers account for from 0.5 to 30% by mass or so; and in those having been beaten in a pulper or a refiner to a degree of beating of at most 600 cc, the lowermost limit of the microfibers is 5% by mass.

In the fibrillated rayon samples from non-beaten rayon having a fiber length of 7 mm (in these, the mass distribution peak for the primary fibers appears within a fiber length range of 7±0.5 mm), the microfibers having a length of at most 1 mm account for from 10 to 65% by mass of the self-weight of the fibrillated rayon. However, in the samples having been beaten in a pulper or a refiner, the microfibers account for from 3 to 50% by mass or so; and in those having been beaten in a pulper or a refiner to a degree of beating of at most 600 cc, the lowermost limit of the microfibers is 8% by mass.

The above are summarized as follows: In case where rayon having an original fiber length of from 3 mm to smaller than 5 mm is beaten (in this case, the mass distribution peak for the primary fibers of the resulting, beaten rayon appears within a fiber length range of from 2.5 mm to smaller than 4.5 mm) and where the degree of beating is smaller than 400 cc, the microfibers having a length of at most 1 mm account for from 0.5 to 15% by mass of the self-weight (that is, the total mass) of the fibrillated rayon. However, in case where the rayon is beaten in a pulper or a refiner, the uppermost limit of the microfibers is 8% by mass or so. On the other hand, in case where the rayon is beaten to a degree of from 400 cc to 700 cc, the microfibers having a length of at most 1 mm account for from 0.1 to 5% by mass of the self-weight of the fibrillated rayon. However, in case where the rayon is beaten in a pulper or a refiner, the uppermost limit of the microfibers is 3% by mass or so. Still on the other hand, in case where the rayon is beaten in a pulper or refiner to a degree of from 400 cc to 600 cc, the lowermost limit of the microfibers is 0.2% by mass.

In case where rayon having an original fiber length of from 5 mm to 7 mm is beaten (in this case, the mass distribution peak for the primary fibers of the resulting, beaten rayon appears within a fiber length range of from 4.5 mm to 7.5 mm) and where the degree of beating is smaller than 400 cc, the microfibers having a length of at most 1 mm account for from 8 to 65% by mass of the self-weight of the fibrillated rayon. However, in case where the rayon is beaten in a pulper or a refiner, the uppermost limit of the microfibers is 30% by mass or so and the lowermost limit thereof can be 5% by mass. On the other hand, in case where the rayon is beaten to a degree of from 400 cc to 700 cc, the microfibers having a length of at most 1 mm account for from 0.3 to 50% by mass of the self-weight of the fibrillated rayon. However, in case where the rayon is beaten in a pulper or a refiner, the uppermost limit of the microfibers is 20% by mass or so. Still on the other hand, in case where the rayon is beaten in a pulper or refiner to a degree of from 400 cc to 600 cc, the lowermost limit of the microfibers is 2% by mass.

The degree of beating of the fibrillated rayon preferred for use in the invention is described. The degree of beating to give fibrillated rayon can be controlled by varying the beating time and by selecting the beating means. Where beating rayon is promoted (to give a beaten, fibrillated rayon that shall have a lowered numerical value indicating its degree of beating), the ratio of short fibers (including microfibers) in mass distribution of the resulting fibrillated rayon will increase. In the invention, the fibrillated rayon preferably has a degree of beating of at most 700 cc. Fibrillated rayon having a degree of beating of larger than 700 cc contains a small amount of microfibers formed therein and therefore could not have a strength necessary for the water-decomposable fibrous sheet of the invention. More preferably, the fibrillated rayon for use herein has a degree of beating of at most 600 cc in order that it can contain a suitable amount of microfibers formed therein. The fibrillated rayon of that type is preferred, since the microfibers constituting it significantly enhance the strength of the fibrous sheet that comprises it. Even more preferably, the degree of beating is at most 400 cc. Even when fibrillated rayon having a degree of beating of at most 200 cc, or even at most 100 cc (for example, 50 cc or 0 cc) is used for sheet production, the water-decomposable fibrous sheet produced and comprising it could have well-balanced wet strength and decomposability in water.

The fineness of the fibrillated rayon in terms of denier is preferably from 1 to 7 d (denier), that is, from 1.1 to 7.7 dtex or so. If its fineness is smaller than the lowermost limit of the defined range, the primary fibers of the fibrillated rayon will be too much entangled, and the decomposability in water of the fibrous sheet comprising it will be poor. On the other hand, if its fineness is larger than the uppermost limit of the defined range, the formation of the fibrous sheet will be not good and, in addition, the productivity thereof will be low. More preferably, the fineness falls between 1.1 and 1.9 dtex.

The fibrous sheet of the invention contains other fibers in addition to the fibrillated rayon mentioned above. Preferably, the other fibers to be in the fibrous sheet have a length of at most 10 mm. Also preferably, they are well dispersible in water, or that is, water-dispersible fibers are preferred for them. The dispersibility in water referred to herein has the same meaning as the decomposability in water, and is meant to indicate that the fibers are dispersed well in water to thereby decompose the sheet comprising them, when kept in contact with a large amount of water. More preferably, the other fibers are biodegradable fibers. The biodegradable fibers naturally decompose by themselves when disposed of in the natural world. The fiber length of the other fibers for use herein is meant to indicate the mean fiber length thereof. Further preferably, the other fibers having a fiber length of at most 10 mm have a length (in terms of the mean fiber length) of at least 1 mm.

The other fibers for use in the invention may be those of at least one sort selected from the group consisting of natural fibers and chemical fibers. The natural fibers include those from wood pulp such as soft wood pulp, hard wood pulp, etc.; and also those from Manila hemp, linter pulp, etc. These natural fibers are biodegradable. Of those, preferred are bleached soft-wood kraft pulp, and bleached hard-wood kraft pulp, as having high dispersibility in water. Also usable herein are chemical fibers such as regenerated fibers of rayon, etc.; synthetic fibers of polypropylene, polyvinyl alcohol, polyester, polyacrylonitrile, etc.; biodegradable synthetic fibers; synthetic pulp of polyethylene, etc. Of those, preferred is rayon, as being biodegradable. Further usable are still other biodegradable fibers of polylactic acid, polycaprolactone, aliphatic polyesters such as polybutylene succinate, polyvinyl alcohol, collagen, etc. Needless-to-say, any fibers other than those mentioned above are usable herein so far as they are dispersible in water.

For the soft wood pulp, its degree of beating preferably falls between 500 and 750 cc or so. If its degree of beating is smaller than the lowermost limit of the defined range, the non-woven fabric comprising the pulp will have a paper-like morphology, and will have a rough feel. If, however, its degree of beating is larger than the uppermost limit of the defined range, the sheet comprising the pulp could not have the necessary strength.

Figure 8:
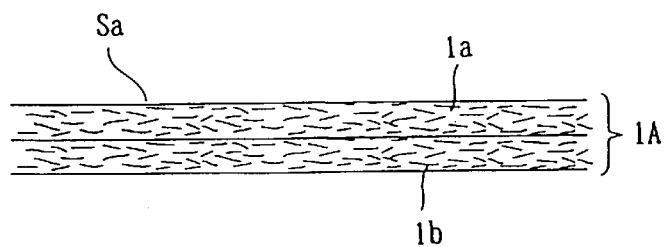
FIG. 8 is a partly-enlarged cross-sectional view showing the water-decomposable fibrous sheet of a first aspect of the invention.

The fibrous sheet of the invention is formed from the fibers mentioned above. FIG. 8 is a partly-enlarged cross-sectional view showing the water-decomposable fibrous sheet of a first aspect of the invention. As in FIG. 8, a water-decomposable fibrous sheet 1A of the invention has a two-layered structure, which is composed of a top layer 1a containing fibrillated rayon and a back layer 1b formed from other fibers not containing fibrillated rayon.

The top layer 1a is formed from fibrillated rayon and other fibers, of which the fibrillated rayon content is at least 3% by mass. Preferably, the fibrillated rayon content of the top layer 1a is at least 5% by mass. It should be noted that the top layer 1a may be entirely formed from fibrillated rayon. In practical use of the fibrous sheet 1A, it is applied to an object in such a manner that the surface of the top layer 1a is kept in contact with the object (for example, the top layer 1a is for wiping the object for wiper applications, or it is contacted with the skin for absorbent applications). The top layer 1a contains fibrillated rayon of which the microfibers are entangled with other fibers, so that its strength is high. In addition, the microfibers exist in the surface of the top layer 1a, and are principally contacted with the surface of the object to be wiped with the sheet. Therefore, a surface 5a of the top layer 1a is resistant to friction. Accordingly, the fibrous sheet is free from the disadvantage of breakage or deformation in its practical use.

On the other hand, the back layer 1b does not contain fibrillated rayon, and is formed from other fibers such as those mentioned above. Since the top layer 1a ensures high strength of the fibrous sheet 1A, the back layer 1b is not always required to have so high strength. Being so constituted, the fibrous sheet 1A realizes high strength of the top layer 1a and good decomposability in water of the back layer 1b. If desired, however, the back layer 1b may contain a smaller amount of fibrillated rayon than in the top layer 1a.

Preferably, the weight (Metsuke) of the fibrous web for the water-decomposable fibrous sheet 1A falls between 20 and 100 g/m², in order that the fibrous sheet can bear wiping in wet and is favorable to the top sheet for absorbent articles. If its weight is smaller than the lowermost limit of the defined range, the sheet could not have the necessary wet strength. If, however, its weight is larger than the uppermost limit of the defined range, the sheet will be not flexible. In particular, for application to the skin of human bodies, the weight of the sheet is more preferably from 30 to 70 g m², in view of the wet strength and the soft feel of the sheet. Accordingly, the weight of each of the top layer 1a and the back layer 1b preferably falls between 10 and 50 g/m², more preferably between 15 and 35 g/m².

A method for producing the water-decomposable fibrous sheet 1A of FIG. 8 is described. The fibrous sheet 1A is in the form of a fibrous web to be obtained, for example, by sheeting the fibers mentioned above in a paper-making process or the like, or in the form of a non-woven fabric to be obtained by processing the fibrous web through water-jetting treatment.

For surely increasing its wet strength, the fibrous sheet of the invention is preferably in the form of a non-woven fabric that may be produced by forming a two-layered fibrous web, for example, in a wet process, followed by processing the fibrous web through water-jetting treatment. It should be noted that a two-layered fibrous web formed in a dry process may be processed through water-jetting treatment.

For water-jetting treatment, employed is an ordinary high-pressure water-jetting device. Through water-jetting treatment, the microfibers extending from the fibrillated rayon that constitutes the fibrous web are entangled with at least either of other microfibers and other fibers, whereby the fiber-to-fiber bonding force of the entangled fibers in the top layer is increased, and, in addition, the dry strength thereof is increased owing to the hydrogen-bonding force of the microfibers. Even when the hydrogen bonds are broken in wet, the entangled fibers could still ensure high wet strength. Through water-jetting treatment, the microfibers extending from fibrillated rayon fibers are entangled with other fibers or microfibers. Accordingly, the fiber-tangling structure of the non-woven fabric having been processed through water-jetting treatment differs from that of an ordinary non-woven spun lace fabric in which the constituent fibers are entangled together by themselves.

Figure 9:
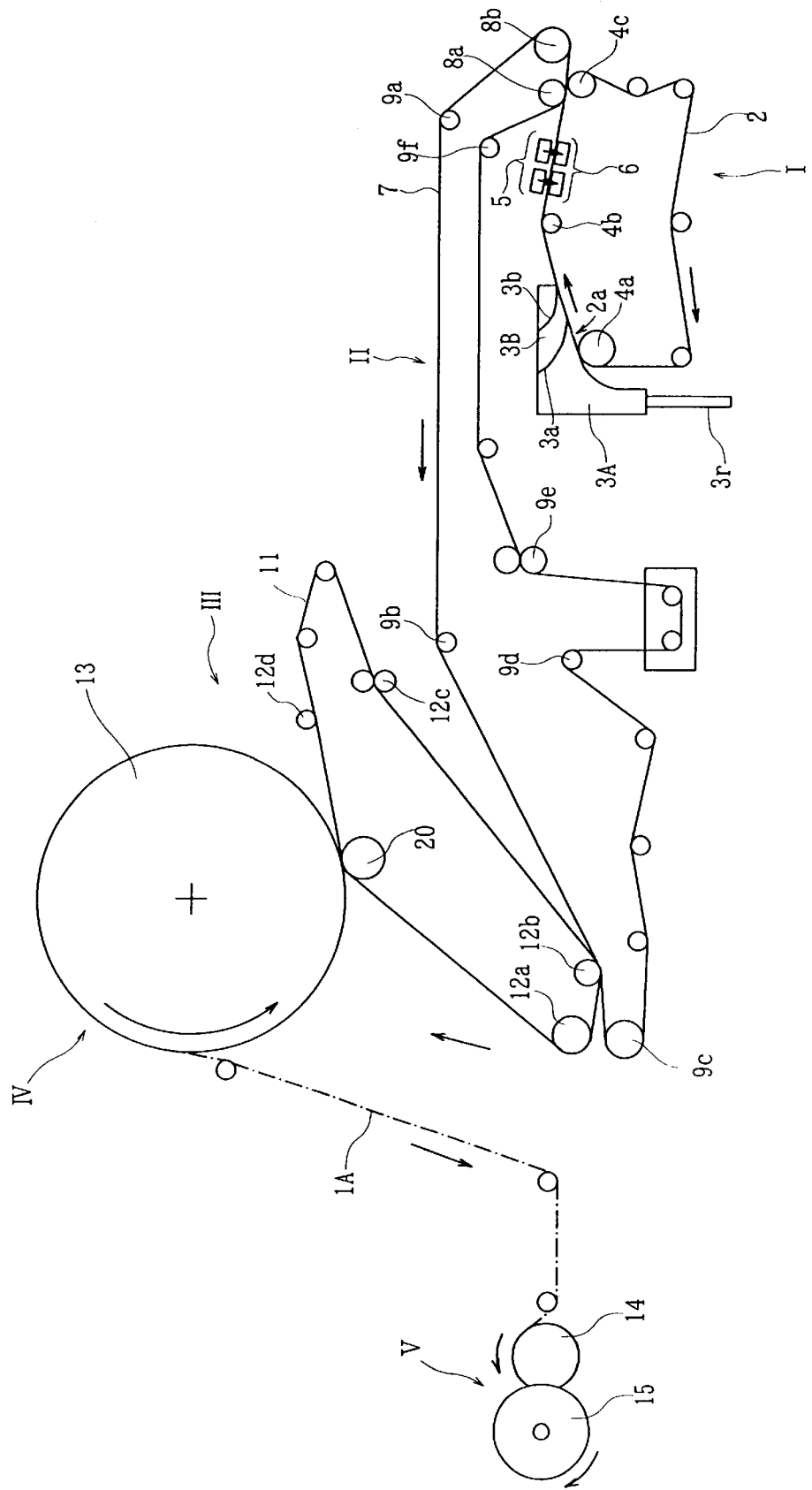
FIG. 9 is a schematic view showing one embodiment of the method and apparatus for producing the water-decomposable fibrous sheet of the invention.

FIG. 9 is an overall schematic view showing one embodiment of the method and apparatus for producing the water-decomposable fibrous sheet (wet-process non-woven fabric) of the invention through water-jetting treatment. The apparatus for producing a non-woven fabric in a wet process of FIG. 9 comprises a non-woven fabric-forming unit I, a felt conveyor unit II, a transfer unit III combined with a latter-stage felt conveyor unit in which the non-woven fabric formed is transferred onto a drying drum, a drier unit IV, and a winder unit V. The non-woven fabric-forming unit I is equipped with a wire conveyor belt 2, which is clockwise rotated at a predetermined speed while being held by a plurality of rolls 4a, 4b, 4c, etc.

The wire conveyor belt 2 faces stock feeders 3A and 3B above its up-rising area 2a between the roll 4a and the roll 4b, and faces a dewatering tank (not shown) below the up-rising area 2a. Into the stock feeder 3A, fibers for forming one layer (back layer or top layer) and water are supplied through a supply port 3r. The fibers fed from the stock feeder 3A onto the wire conveyor belt 2 is attracted to the wire conveyor belt 2 by the air suction force of the dewatering tank below the up-rising area 2a. The stock feeder 3A is adjacent to a heel slice 3a that faces the wire conveyor belt 2 via a gap therebetween, and the gap between the wire conveyor belt 2 and the heel slice 3a serves to form a fibrous web (back layer or top layer) having a predetermined thickness on the wire conveyor belt 2.

Into the stock feeder 3B, fibers for forming another layer (top layer or back layer) and water are supplied through a supply port (not shown). The fibers fed from the stock feeder 3B onto the fibrous web is attracted to the fabric web by the air suction force of the dewatering tank below the up-rising area 2a. The stock feeder 3B is adjacent to a heel slice 3b that faces the fibrous web on the wire convey belt 2 via a gap therebetween, and the gap between the fibrous web and the heel slice 3b serves to form another fibrous web (top layer or back layer) having a predetermined thickness on the previously-formed fibrous web.

In case where a fibrous sheet of which the top layer 1a contains a large amount of fibrillated rayon is produced according to the method as above, a web not containing fibrillated rayon for the back layer 1b is first formed from the stock from the stock feeder 3A, and thereafter another web that contains fibrillated rayon is formed on the previously-formed web from the stock from the stock feeder 3B. In that manner, the fibrillated rayon in the upper web hardly passes away through the underlying web and through the wire conveyor belt 2, and its retentiveness in the layered web is high. On the other hand, in case where fibrillated rayon-free fibers are fed from the stock feeder 3A to form a lower web and thereafter fibrillated rayon-containing fibers are fed from the stock feeder 3B over the lower web to form an upper web thereover, a small amount of the fibrillated rayon in the upper web will move into the lower web through air suction and through water-jetting treatment in the subsequent step. In the two-layered fabric thus produced, the lower web shall contain a smaller amount of fibrillated rayon than in the upper web.

To form the back layer 1b, fibers containing a smaller amount of fibrillated rayon can be fed from the stock feeder 3A than from the stock feeder 3B.

The stock feeder member may have a three-stage configuration, with which a three-layered or more multi-layered fibrous sheet can be produced.

Between the rolls 4b and 4c, a single-stage or multi-stage water-jetting nozzle 5 is disposed above the wire conveyor belt 2, and it faces a dewatering tank 6 disposed below the wire conveyor belt 2. To the fibrous web having passed through the gap at the heel slice 3b and formed on the wire conveyor belt 2, water jets are applied through the water-jetting nozzle 5. As a result of the water-jetting treatment, the fibers of the fibrous webs, especially the microfibers extending from the fibrillated rayon fibers in the webs are entangled, and the intended fibrous sheet 1A (non-woven fabric) is produced.

The wire conveyor belt 2 is contacted with a felt conveyor belt 7 in the felt conveyor unit (felt part) II. The felt conveyor belt 7 is made of a needled blanket, and its texture roughness differs from that of the wire conveyor belt 2. Therefore, the fibrous sheet 1A (non-woven spun lace fabric) formed on the wire conveyor belt 2 is transferred onto the felt conveyor belt 7. In the felt conveyor unit II, a roll 8a is an air suction transfer means, or that is, a suction pick-up roll, via which, therefore, the fibrous sheet 1A is readily transferred from the wire conveyor belt 2 onto the felt conveyor belt 7. In the felt conveyer unit II, the felt conveyor belt 7 is rotated counterclockwise while being held by the rolls 8a and 8b and by other rolls 9a, 9b, 9c, 9d, 9e, 9f, etc.

In the latter-stage felt conveyor unit, disposed is a second felt conveyor belt 11. Like the felt conveyor belt 7, the second felt conveyor belt 11 is made of a needled blanket, and this is held by a plurality of rolls 12a, 12b, 12c and 12d. Around a pressure roll 20 in the unit, the second felt conveyor belt 11 meets a drier drum 13, and the fibrous sheet 1A on the second felt conveyor belt 11 is transferred onto the drier drum 13. In the drier unit IV, the fibrous sheet 1A is thus wound around the drier drum 13, and dried thereon. After having been thus dried, the fibrous sheet 11A is wound up by a winder roll 14 into a roll 15. Through the process, producing the fibrous sheet 1A as a roll is finished.

To further enhance its surface friction resistance, the fibrous sheet of the invention is preferably further processed for skin formation, for which the sheet is heated under pressure while its surface is still wet. Through skin formation treatment, the amount of the hydrogen-bonded microfibers in the sheet could be increased. In the method mentioned above, the surface of the drier drum 13 is smooth and is heated. In the transfer unit III, the fibrous sheet 11A is pressed between the pressure roll 20 and the drier drum 13. In this step, the top layer 1a is so positioned that it faces the drier drum 13. The fibrous sheet 1A contains water having been applied thereto through water-jetting treatment, and it is heated under pressure against the smooth surface of the drier drum 13 whereby the fibers constituting it are more highly bonded to each other via hydrogen bonding. In particular, the hydrogen bonding of the microfibers that extend from the fibrillated rayon in the surface of the fibrous sheet 1A is much enhanced. As a result, the top layer 1a of the fibrous sheet 1A is smooth-faced and its surface strength is increased. Accordingly, in its practical use, the fibrous sheet 1A is hardly broken even when its surface is rubbed against objects. Through skin formation treatment, the amount of the hydrogen-bonded microfibers in the fibrous sheet is much increased. As a result of skin formation treatment, therefore, the strength of the fibrous sheet is much increased not only in dry but also even in wet with a small amount of water.

Fiber-to-fiber bonds in the fibrous sheet increase through skin formation treatment, but they are readily loosened in a large amount of water, for example, when the fibrous sheet is disposed of in flush toilets, etc. Skin formation treatment increases the surface friction resistance of the fibrous sheet and even the strength of the sheet itself, but does not almost detract from the decomposability of the sheet in water. For skin formation treatment, for example, embossing rolls or pressure plates may be used in place of the drier drum 13 and the pressure roll 20.

The fibrous sheet of the invention does not always require water-jetting treatment. The hydrogen bonds of the OH groups existing in the surfaces of fibrillated rayon fibers increase the strength of the water-decomposable fibrous sheet not processed with water jets, especially the dry strength thereof. With the increase in the degree of fibrillation of rayon fibers in the sheet, or that is, with the increase in the amount of microfibers therein, the surface area of the fibers constituting the sheet increases and the fiber-to-fiber bonding strength of hydrogen bonds in the sheet is thereby enhanced. In the sheet produced in a paper-making process, the hydrogen-bonding force of the microfibers is comparable to or larger than that of pulp, and the sheet strength is high. Depending on the hydrogen-bonding force of the microfibers constituting the sheet, the decomposability in water of the sheet could be well balanced with the mechanical strength thereof. The dry strength of the sheet produced in a paper-making process is especially high. Even in the fibrous sheet produced in a paper-making process, the microfibers can be partly entangled, so that the wet strength of the sheet can be high.

Figure 10:
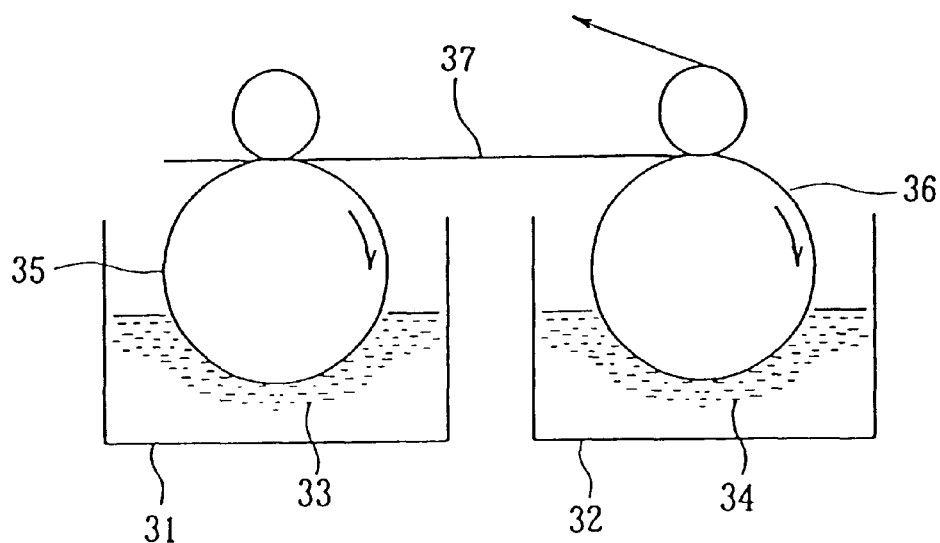
FIG. 10 is a schematic view showing another embodiment of the method and apparatus for producing the water-decomposable fibrous sheet of the invention.

For example, in the non-woven fabric-forming unit I in the method mentioned above, the non-woven fabric may be formed with no water-jetting treatment applied thereto. Additionally, a two-layered fibrous sheet 1A may be formed in a paper-making unit as in FIG. 10. The paper-making unit comprises a first stock tank 31 and a second stock tank 32, in which, for example, a first stock 33 for forming a back layer is put into the first stock tank 31 and a second stock 34 for forming a top layer is put into the second stock tank 32. One paper-making cylinder 35 is set in the first stock tank 31, and another paper-making cylinder 36 is set in the second stock tank 32. A wire belt 37 above the paper-making cylinders is rotated counterclockwise; and the paper-making cylinders 35 and 36 are clockwise rotated. In the first stock tank 31, the first stock 33 is scooped up by the paper-making cylinder 35 and transferred onto the wire belt 37 to form thereon a first fibrous web (back layer 1b); and in the second stock tank 32, the second stock 34 is scooped up by the paper-making cylinder 36 and transferred onto the first fibrous web to form thereon a second fibrous web (top layer 1a). In that manner, a two-layered fibrous sheet is produced.

The fibrous sheet thus produced in the paper-making process as above can be also processed for skin formation. Briefly, after having been produced still in wet, or after having been once dried and again wetted with water, the fibrous sheet is pressed under heat. As a result, the fibers, especially the microfibers existing in the surface of the thus-pressed sheet are hydrogen-bonded to a higher degree, whereby the surface strength of the sheet is increased.

Figure 11:
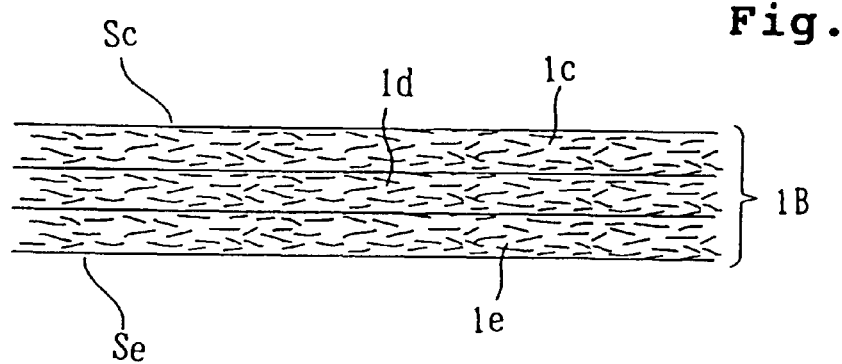
FIG. 11 is a partly-enlarged cross-sectional view showing the water-decomposable fibrous sheet of a second aspect of the invention.

FIG. 11 is a partly-enlarged cross-sectional view showing the water-decomposable fibrous sheet of a second aspect of the invention. As shown in FIG. 11, the fibrous sheet 1B is composed of a top layer 1c, a back layer 1e, and an interlayer 1d sandwiched between the top layer 1c and the back layer 1e. The top layer 1c and the back layer 1e are the same as the top layer 1a of the two-layered fibrous sheet 1A mentioned above, and these are made from fibrillated rayon fibers and other fibers. The fibrillated rayon content of each of these layers 1c and 1e is at least 3% by mass, preferably at least 5% by mass. If desired, the top layer 1c and the back layer 1e are entirely made from fibrillated rayon fibers only.

On the other hand, the interlayer 1d does not contain fibrillated rayon, and is made from other fibers only. Since it is sandwiched between the top layer 1c and the back layer 1e both having high strength, its wet strength may be extremely low. For example, it may be like toilet paper, formed from soft wood pulp only. However, the interlayer 1d may contain a smaller amount of fibrillated rayon than in the top layer 1c and the back layer 1e.

In the fibrous sheet 1B, the top layer 1c and the back layer 1e contain fibrillated rayon, so that the strength of the both surfaces of the fibrous sheet 1B is high. Accordingly, both surfaces 5c and 5e of the top layer 1c and the back layer 1e of the fibrous sheet 1B could be applied to objects in practical use. For wiper applications, the fibrous sheet of this type is convenient, since users are not required to pay any attention to the surfaces of the sheet. While used, the sheet exhibits high strength owing to the properties of the top layer 1c and the back layer 1e; and after it has been used and contacted with a large amount of water in flush toilets, the entangled microfibers in the top layer 1c and the back layer 1e are, needless to say, readily loosened, and, in addition, since the interlayer 1d is more readily decomposed in water than the top layer 1c and the back layer 1e, the decomposability of the fibrous sheet is high as a whole.

Preferably, both surfaces or at least one surface of the top layer 1c and the back layer 1e of the three-layered fibrous sheet of FIG. 11 are/is processed for skin formation.

The water-decomposable fibrous sheet of the invention may have a four-layered or more multi-layered structure. To produce the water-decomposable fibrous sheet of the invention, the individual layers may be separately formed and laminated by bonding them. For bonding the layers, a water-soluble or water-swellable adhesive may be used. As the case may be, the constituent layers may be pressed under heat while they are wet, whereby the fibers in the thus-laminated layers may be bonded together through hydrogen bonding.

Preferably, the strength at break in wet of the water-decomposable fibrous sheet of the invention that contains water is at least 1.1 N/25 mm in terms of the root mean square of the strength in the machine direction (MD) of the non-woven fabric for the sheet and that in the cross direction (CD) thereof. The strength at break in wet (this is herein referred to as wet strength) is meant to indicate the tensile strength at break (N) of the fibrous sheet in wet. To obtain its wet strength in terms of the tensile strength at break, a piece of the fibrous sheet having a width of 25 mm and a length of 150 mm is immersed in water to thereby infiltrate water of 2.5 times the mass of the sheet into the sheet piece, and the thus-wetted sheet piece is pulled until it is broken, by the use of a Tensilon tester, for which the chuck distance is 100 mm and the stress rate is 100 mm/min. However, the data thus measured according to the method are merely the criterion for the strength of the fibrous sheet, and the fibrous sheet of the invention will have a strength that is substantially the same as the wet strength thereof measured in the manner as above. More preferably, the wet strength of the fibrous sheet is at least 1.3 N/25 mm.

On the other hand, it is also desirable that the fibrous sheet has high strength enough for its use even in dry. Therefore, the dry strength of the fibrous sheet is preferably at least 3.4 N/25 mm in terms of the root mean square of the strength at break in the machine direction (MD) of the non-woven fabric for the sheet and that in the cross direction (CD) thereof.

Also preferably, the water-decomposable fibrous sheet of the invention has a degree of decomposition in water of at most 300 seconds, more preferably at most 200 seconds, even more preferably at most 120 seconds. The degree of decomposition in water is measured according to the test method of JIS P-4501 that indicates the degree of easy degradation of toilet paper in water. The outline of the paper degradation test method is described. A piece of the water-decomposable fibrous sheet of the invention having a length of 10 cm and a width of 10 cm is put into a 300-ml beaker filled with 300 ml of ion-exchanged water, and stirred therein with a rotor. The revolution speed of the rotor is 600 rpm. The condition of the test piece being dispersed in water is macroscopically observed at predetermined time intervals, and the time until the test piece is finely dispersed is measured. However, the data thus measured according to the method are merely the criterion for the decomposability in water of the fibrous sheet, and the fibrous sheet of the invention will have a degree of decomposition in water that is substantially the same as the data measured in the manner as above.

Regarding the dry surface friction resistance of the fibrillated rayon-containing top layer of the water-decomposable fibrous sheet of the invention, it is desirable that the top layer in dry is resistant to at least three rubbing cycles in the rubbing test of JIS P-8136 for paper boards. Briefly, in the test method of JIS P-8136, a test piece (fibrous sheet) is fitted onto a slide stand (B), and a rubbing member (A) with a piece of artificial leather attached thereto is rubbed against the test piece. The number of rubbing cycles is counted before fibers are peeled off to form roundish fibrous fluffs on the surface of the test piece. More preferably, the top layer of the fibrous sheet of the invention is resistant to at least ten rubbing cycles in the test.

For the wet surface friction resistance of the fibrillated rayon-containing top layer of the fibrous sheet, it is also desirable that the top layer in wet is resistant to at least three rubbing cycles in the rubbing test. For wiper sheets and absorbent articles, the fibrous sheet must be resistant to surface friction even in wet in some degree. The fibrous sheet in wet contains water of at least 2.5 times the self-weight of the dry sheet. In the water-decomposable fibrous sheet of the invention, the microfibers extending from the surfaces of the fibrillated rayon fibers constituting the sheet are entangled and the fibers are therefore bonded together to a suitable degree. Accordingly, even in wet, the sheet is still resistant to surface friction. More preferably, the top layer of the fibrous sheet of the invention is, even in wet, still resistant to at least ten rubbing cycles in the test.

To make the water-decomposable fibrous sheet of the invention have a degree of decomposition in water, a degree of mechanical strength and a degree of surface friction resistance that fall within the preferred ranges noted above, the type of the fibers constituting the sheet, the proportion of the fibers, the weight of the sheet, and the conditions for water-jetting treatment for the sheet may be varied. For example, where fibrillated rayon having a long fiber length is used, or where fibrillated rayon not beaten so much (that is, having an increased numerical value indicating its degree of beating) is used, the weight of the fibrous sheet is reduced, or the processing energy for water-jetting treatment is reduced, whereby the fibrous sheet could have an increased degree of decomposition in water and an increased wet strength.

Even though not containing a binder, the water-decomposable fibrous sheet of the invention could have a high degree of decomposition in water and a high wet strength. However, in order to further increase the wet strength of the fibrous sheet, a water-soluble or water-swellable binder capable of binding fibers together may be added to the sheet. Having met a large amount of water, the binder shall dissolve or swell therein and therefore lose its fiber-binding ability. The binder usable herein includes, for example, carboxymethyl cellulose; alkyl celluloses such as methyl cellulose, ethyl cellulose, benzyl cellulose, etc.; polyvinyl alcohol; modified polyvinyl alcohols having a predetermined amount of a sulfonic acid group or a carboxyl group, etc. The amount of the binder to be added to the fibrous sheet may be smaller than usually. For example, only about 2 g of the binder, relative to 100 g of the fibers constituting the fibrous sheet, may be added to the sheet whereby the wet strength of the sheet could be increased to a satisfactory degree. Accordingly, adding such a small amount of a binder to the fibrous sheet does not so much interfere with the safety of the sheet. To add a water-soluble binder to the non-woven fabric for the fibrous sheet, employable is a coating method of applying the binder to the non-woven fabric through a silk screen. On the other hand, a water-swellable binder may be added to the fibrous web for the sheet while the fibrous web is prepared in a paper-making process.

The binder may be incorporated into all layers constituting the fibrous sheet. If not, it is desirable that the binder is incorporated into the layers not containing fibrillated rayon. This is because the microfibers in the fibrillated rayon-containing layers enhance the mechanical strength of the layers.

Where a binder such as that mentioned above is added to the fibrous sheet of the invention, an electrolyte such as a water-soluble inorganic or organic salt may be added thereto along with the binder, whereby the wet strength of the sheet could be increased much more. The inorganic salt includes, for example, sodium sulfate, potassium sulfate, zinc sulfate, zinc nitrate, potassium alum, sodium chloride, aluminium sulfate, magnesium sulfate, potassium chloride, sodium carbonate, sodium hydrogencarbonate, ammonium carbonate, etc.; and the organic salt includes, for example, sodium pyrrolidone-carboxylate, sodium citrate, potassium citrate, sodium tartrate, potassium tartrate, sodium lactate, sodium succinate, potassium pantothenate, calcium lactate, sodium laurylsulfate, etc. Where an alkyl cellulose is used as the binder, it is preferably combined with a monovalent salt. Where a modified or non-modified polyvinyl alcohol is used as the binder, it is preferably combined with a monovalent salt.

In addition, where an alkyl cellulose is used as the binder, any of the following compounds may be added to the water-decomposable fibrous sheet so as to further increase the strength of the sheet. The additional compounds include, for example, copolymers of a polymerizable acid anhydride monomer with other comonomers, such as (meth)acrylic acid-maleic acid resins, (meth)acrylic acid-fumaric acid resins, etc. Preferably, the copolymers are saponified with sodium hydroxide or the like into water-soluble copolymers partially having a sodium carboxylate moiety. Adding an amino acid derivative such as trimethylglycine or the like to the sheet is also desirable, as also enhancing the strength of the sheet.

The water-decomposable fibrous sheet of the invention may optionally contain any other substances, without interfering with the advantages of the invention. For example, it may contain any of surfactants, microbicides, preservatives, deodorants, moisturizers, alcohols such as ethanol, polyalcohols such as glycerin, etc.

As having good decomposability in water and high wet strength, the water-decomposable fibrous sheet of the invention is usable as wet tissue for application to the skin of human bodies including the private parts thereof, or as cleaning sheets for toilets and thereabouts. To enhance its wiping and cleaning capabilities for those applications, the sheet may previously contain water, surfactant, alcohol, glycerin and the like. Where the water-decomposable fibrous sheet of the invention is, while being previously wetted with liquid detergent and the like, packaged for public sale, it shall be airtightly packaged and put on the market so that it is not spontaneously dried. On the other hand, the water-decomposable fibrous sheet may be marketed in dry. The users who have bought the dry water-decomposable fibrous sheet may wet it with water or liquid chemicals before use.

Since the water-decomposable fibrous sheet of the invention has high dry strength, and since it does not always require adding binders and electrolytes thereto, being different from conventional water-decomposable fibrous sheets, it is highly safe for its application to the skin. Accordingly, the fibrous sheet of the invention is usable as the sheet component of various water-decomposable absorbent articles including, for example, sanitary napkins, panty liners, sanitary tampons, disposable diapers, etc. For example, when the fibrous sheet is perforated, it may be used as the top sheet for water-decomposable absorbent articles. Even though having absorbed body discharge fluid, the fibrous sheet could still maintain a predetermined level of wet strength, and is therefore deformed little during use. When the fibrous sheet is combined with any other fibers, it is usable as an absorbent layer, a cushion layer, a back sheet, etc.

EXAMPLES

The invention is described in more detail with reference to the following Examples, which, however, are not intended to restrict the scope of the invention.

Example A:

Rayon fibers (from Acordis Japan) were fibrillated in a mixer to prepare various types of fibrillated rayon having different degrees of beating as in Table 5. From the fibrillated rayon, ordinary non-fibrillated rayon (1.7 dtex (1.5 d), fiber length 5 mm), and bleached soft-wood kraft pulp (NBKP) (Canadian Standard Freeness, CSF=600 cc), formed were two-layered fibrous webs. The blend ratio of the fibers in the top layer and the back layer of each web is indicated in Table 5. The back layer contained the fibrillated rayon. The fiber length of the fibrillated rayon shown in the Table 5 is that of the non-beaten rayon.

Without being dried but still on the plastic wire, the resulting fibrous web was put on a running conveyor. While being moved at the speed indicated in Table 5, the fibrous web was subjected to water-jetting treatment, whereby the fibers constituting it were entangled. The high-pressure water-jetting device used for the treatment was equipped with 2000 nozzles/meter each having an orifice diameter of 95 microns, at intervals of 0.5 mm between the adjacent nozzles, and the pressure of jetting water streams applied to the web was 294 N/cm$^2$. In that condition, jetting water was applied to the top surface of the web so that it passed through its back surface. The running speed of the web was 30 m/min. The water-jetting treatment was repeated once again under the same condition. This is the second-stage water-jetting treatment. Next, the web was dried with a Yankee drier to obtain a water-decomposable fibrous sheet. This was then immersed in 250 g, relative to 100 g of the mass of the non-woven fabric, of ion-exchanged water. The thus-obtained water-decomposable fibrous sheet was tested in dry and in wet for decomposability in water, strength and friction fastness.

The test for decomposability in water was based on the test of JIS P-4501 indicating the degree of degradability of toilet paper. Precisely, a piece of the water-decomposable fibrous sheet having a length of 10 cm and a width of 10 cm was put into a 300-ml beaker filled with 300 ml of ion-exchanged water, and stirred therein with a rotor. The revolution speed of the rotor was 600 rpm. The condition of the test piece being dispersed in water was macroscopically observed at predetermined time intervals, and the time until the test piece was dispersed was measured (see the following Table—the data are expressed in seconds).

The wet strength was measured according to the test method stipulated in JIS P-8135. Briefly, a piece of the water-decomposable fibrous sheet having a width of 25 mm and a length of 150 mm was tested both in the machine direction (MD) and in the cross direction (CD), by the use of a Tensilon tester, for which the chuck distance was 100 mm and the stress rate was 100 mm/min. The strength at break (N) of the test piece thus measured indicates the wet strength thereof (see the following Table—the data are expressed in N/25 mm).

To determine its surface friction resistance, the fibrous sheet was tested for friction fastness according to the abrasion resistance test method for paper boards stipulated in JIS P-8136. Briefly, a rubbing member A with a piece of artificial leather attached thereto was rubbed against the fibrillated rayon-containing top layer of the fibrous sheet to be tested, under a load of 500 g (4.9 N).

Fibrous sheets of Comparative Example were produced in the same manner as in Example, for which the blend ratio of the fibers is indicated in Table 5. The fibrous sheets of Comparative Example are all single-layered ones. The weight of the fibrous sheets of Example and Comparative Example is all 50 g/m².

The data obtained are given in Table 5.

The data obtained are given in Table 6.

TABLE 6

|  | B-1 | |
| --- | --- | --- |
|  | top layer | back layer |
| NBKP (600 cc) | 60% | 60% |
| Fibrillated Rayon (1.7 dtex × 5 mm) | 10% | — |
| Rayon (1.7 dtex × 5 mm) | 30% | 40% |
| Fibrillated Rayon Content of Fibrous Sheet | 5% | |
| Dry Strength (N/25 mm) | 21.1 | |
| Wet Strength (N/25 mm) | 3.8 | |
| Dry Friction Fastness (number of rubbing cycles) | 18 | |
| Wet Friction Fastness (number of rubbing cycles) | 12 | |
| Dry Decomposability in water (sec) | 118 | |
| Wet Decomposability in water (sec) | 134 | |

Comparing A-1 in Table 5 and B-1 in Table 6, it is understood that the latter having been processed for skin

TABLE 5

|  | Comparative Example 1 single layer | A-1 top layer | A-1 back layer | Comparative Example 2 single layer | A-2 top layer | A-2 back layer | Comparative Example 3 single layer |
| --- | --- | --- | --- | --- | --- | --- | --- |
| NBKP (600 cc) | 60% | 60% | 60% | 60% | 60% | 60% | 60% |
| fibrillated Rayon (1.7 dtex × 5 mm) | 5% | 10% | — | 10% | 20% | — | 20% |
| Rayon (1.7 dtex × 5 mm) | 35% | 30% | 40% | 30% | 20% | 40% | 20% |
| Fibrillated Rayon Content of Fibrous Sheet | 5% | 5% | | 10% | 10% | | 10% |
| Dry Strength (N/25 mm) | 21.8 | 17.8 | | 24.7 | 22.2 | | 21.5 |
| Wet Strength (N/25 mm) | 2.9 | 3.1 | | 3.3 | 3.1 | | 4.0 |
| Dry Friction Fastness (number of rubbing cycles) | 7 | 12 | | 10 | 15 | | 17 |
| Wet Friction Fastness (number of rubbing cycles) | 3 | 7 | | 5 | 9 | | 8 |
| Dry Decomposability in water (sec) | 126 | 105 | | 108 | 97 | | 123 |
| Wet Decomposability in water (sec) | 128 | 114 | | 127 | 124 | | 144 |

In Table 5, Comparative Example 1 and A-1 are compared. It is understood that A-1 has increased decomposability in water, not so much lowering its strength. In addition, A-1 has increased friction resistance, since the fibrillated rayon is concentrated in its top layer. The data support the well-balanced decomposability in water and strength of the two-layered fibrous sheets.

Moreover, it is understood that the strength of A-1 is comparable to that of Comparative Example 2, though the overall fibrillated rayon content of A-1 is smaller than that of Comparative Example 2, concretely the former is half the latter. This means that the overall fibrillated rayon content of the two-layered fibrous sheet can be reduced and the production costs thereof can be reduced.

The same shall apply also to A-2.

Example B:

In Example B, the sample A-1 produced in the previous Example A was processed for skin formation, and tested for the properties. To process it for skin formation, the fibrous sheet A-1 was pressed between a rotary drier and a roll, at a temperature of 130° C. and under a pressure of 0.02 N.

formation has increased surface strength (friction fastness) and its decomposability in water is lowered little. In addition, it is also understood that B-1 has increased dry strength and wet strength.

As is understood from the test data as above, the top layer of the multi-layered water-decomposable fibrous sheet of the invention has high strength, taking advantage of the tangling and/or hydrogen-bonding force of the microfibers that extend from the fibrillated rayon therein. Accordingly, the fibrous sheet has good decomposability in water and high strength, and its top surface is resistant to friction.

When the fibrous sheet is used for wiping objects, the microfibers of the fibrillated rayon in its top surface are directly contacted with the objects, and the friction to the fibrous sheet is reduced, and therefore the fibrous sheet enjoys good durability for wiping applications. In addition, when the fibrous sheet is used for the top sheet of absorbent articles, it is not deformed during use and gives a comfortable feel to users.

Even though containing a relatively small amount of fibrillated rayon, the fibrous sheet still has high strength, and therefore its production costs can be reduced.

Here, 'comprises/comprising' when used in this specification is taken to specify the presence of stated features, integers, steps or components but does not preclude the presence or addition of one or more other features, integers, steps, components or groups thereof.

While the invention has been described in detail and with reference to specific embodiments thereof, it will be apparent to one skilled in the art that various changes and modifications can be made therein without departing from the spirit and scope thereof.

What is claimed is:

1. A multi-layered water-decomposable fibrous sheet with a plurality of layers each having a different fibrous constitution integrated therein, the fibrous sheet having a total sheet weight between 20 and 100 g/m$^2$, comprising:

a top layer on a top surf ace including fibrillated rayon and other fibers having a length of between 1 and 10 mm, the content of the fibrillated rayon being at least 3% by weight of all fibers constituting the top layer, the fibrillated rayon having a degree of beating of at most 700 cc, having a degree of fineness in a range of 1 to 7 denier, and having primary fibers of a predetermined fiber length and microfibers extending from the primary fibers, the primary fiber having a length of between 1.8 mm and 10 mm at the peak of its self weighted average fiber distribution, the microfibers having a length of at most 1 mm and being present in an amount of between 0.1 and 65% of the weight of the fibrillated rayon, the microfibers being at least one of entangled with and hydrogen-bonded to at least one of other microfibers and other fibers, and a back layer on a back surface including fibers having a length of between 1 and 10 mm but containing no fibrillated rayon, the fibers being at least one of entangled with and hydrogen-bonded to each other, or the back layer including the fibrillated rayon in an amount smaller than that in the top layer, the microfibers of the fibrillated rayon being at least one of entangled with and hydrogen-bonded to at least one of the other microfibers and the other fibers.

2. The water-decomposable fibrous sheet as claimed in claim 1, wherein the surface of the top layer is pressed under heat so that the microfibers of the fibrillated rayon in the surface pressed under heat are hydrogen-bonded to at least one of the other microfibers and the other fibers.

3. The water-decomposable fibrous sheet as claimed in claim 1, wherein the fibrous sheet is a non-woven fabric after being subjected to water-jetting treatment.

4. The water-decomposable fibrous sheet as claimed in claim 1, wherein the fibrous sheet is produced in a paper-making process.

5. The water-decomposable fibrous sheet as claimed in claim 1, wherein the fibrillated rayon has degree of fineness of between 1.1 and 1.9 dtex.

6. The water-decomposable fibrous sheet as claimed in claim 1, wherein the sheet has a decomposability in water of at most 200 seconds.

7. The water-decomposable fibrous sheet as claimed in claim 1, wherein the sheet has a wet strength of at least 1.1 N/25 mm.

8. The water-decomposable fibrous sheet as claimed in claim 1, wherein the sheet has a dry strength of at least 3.4 N/25 mm.

9. A multi-layered water-decomposable fibrous sheet with a plurality of layers each having a different fibrous constitution integrated therein, the fibrous sheet having a total sheet weight between 20 and 100 g/m$^2$, comprising:

a top layer on a top surface and a back layer on a back surface each including fibrillated rayon and other fibers having a length of between 1 and 10 mm, the content of the fibrillated rayon being at least 3% by weight of all fibers constituting each layer, the fibrillated rayon having a degree of beating of at most 700 cc, having a degree of fineness in a range of 1 to 7 denier, and having primary fibers of a predetermined fiber length and microfibers extending from the primary fibers, the primary fiber having a length of between 1.8 mm and 10 mm at the peak of its self weighted average fiber distribution, the microfibers having a length of at most 1 mm and being present in an amount of between 0.1 and 65% of the weight of the fibrillated rayon, the microfibers being at least of entangled with and hydrogen-bonded to at least one of other microfibers and other fibers, and an interlayer disposed between the top layer and the back layer including fibers having a length of between 1 and 10 mm but containing no fibrillated rayon, the fibers being at least one of entangled with and hydrogen-bonded to each other, or the interlayer including fibrillated rayon in an amount smaller than that in the top and back layers, the microfibers of the fibrillated rayon being at least one of entangled with and hydrogen-bonded to at least one of the other microfibers and the other fibers.

10. The multi-layered water-decomposable fibrous sheet as claimed in claim 9, wherein the fibrillated rayon content of the fibers constituting the top layer is almost identical to the fibers constituting the back layer.

11. The water-decomposable fibrous sheet as claimed in claim 9, wherein at least one of surfaces of the top and back layers is pressed while subjected to heat so that the microfibers of the fibrillated rayon in the surface pressed while subjected to heat are hydrogen-bonded to at least one of the other microfibers and the other fibers.

12. The water-decomposable fibrous sheet as claimed in claim 9, wherein the fibrous sheet is a non-woven fabric after being subjected to water-jetting treatment.

13. The water-decomposable fibrous sheet as claimed in claim 9, wherein the fibrous sheet is produced in a paper-making process.

14. The water-decomposable fibrous sheet as claimed in claim 9, wherein the fibrillated rayon has a degree of fineness of between 1.1 and 1.9 dtex.

15. The water-decomposable fibrous sheet as claimed in claim 9, wherein the sheet has a decomposability in water of at most 200 seconds.

16. The water-decomposable fibrous sheet as claimed in claim 9, wherein the sheet has a wet strength of at least 1.1 N/25 mm.

17. The water-decomposable fibrous sheet as claimed in claim 9, wherein the sheet has a dry strength of at least 3.4 N/25 mm.

* * * * *